(12) United States Patent
De Saegher et al.

(10) Patent No.: US 11,839,218 B2
(45) Date of Patent: Dec. 12, 2023

(54) METHODS FOR TREATING A FUNGAL INFECTION ON A STONE FRUIT TREE

(71) Applicant: BIPA NV, Londerzeel (BE)

(72) Inventors: Johan De Saegher, Destelbergen (BE); Son Nguyen Huu, Ghent (BE); Andrea Nesler, Pergine Valsugana (IT); Ann Vermaete, Hamme (BE); Sandro Frati, Antwerp (BE)

(73) Assignee: BIPA NV, Londerzeel (BE)

( * ) Notice: Subject to any disclaimer, the term of this patent is extended or adjusted under 35 U.S.C. 154(b) by 0 days.

(21) Appl. No.: 17/299,920

(22) PCT Filed: Dec. 4, 2019

(86) PCT No.: PCT/EP2019/083600
§ 371 (c)(1),
(2) Date: Jun. 4, 2021

(87) PCT Pub. No.: WO2020/115097
PCT Pub. Date: Jun. 11, 2020

(65) Prior Publication Data
US 2022/0039393 A1   Feb. 10, 2022

(30) Foreign Application Priority Data
Dec. 4, 2018 (BE) .................................. 2018/5854

(51) Int. Cl.
*A01N 63/38* (2020.01)
(52) U.S. Cl.
CPC .................................... *A01N 63/38* (2020.01)
(58) Field of Classification Search
CPC ..................................................... A01N 63/38
See application file for complete search history.

(56) References Cited

U.S. PATENT DOCUMENTS 8,431,120 B2 *   4/2013   Pertot ...................... C12N 1/14
                                                               424/93.5

FOREIGN PATENT DOCUMENTS

| EP | 2865267 | * | 4/2015 |
| ES | 2 395 518 A1 | | 2/2013 |
| WO | WO 2009/116106 A1 | | 9/2009 |
| WO | WO 2017/212032 | * | 12/2017 |

OTHER PUBLICATIONS

Webster's New World Dictionary, The World Publishing Co., New York, p. 1127 (1972).*
Gillman, D., "Peach leaf curl," Center for Agriculture, Food, and the Environment, UMass Extension Landscape, Nursery and Urban Forestry Program, Sep. 2011; retrieved from the Internet :<https://ag.umass.edu/landscape/fact-sheets/peach-leaf-curl>.*
Bernat, M. et al., "Influence of temperature on decay, mycelium development and sporodochia production caused by Monilinia fructicola and M. laxa on stone fruits," Food Microbiology, vol. 64, pp. 112-118 (2017).*
U.S. Environmental Protection Agency, Notice of Pesticide Registration, VINTEC® (2020).*
European Food Safety Authority, "Conclusion on the peer review of the pesticide risk assessment of the active substance Trichoderma atroviride strain SC1," EFSA Journal 2015, 13(4):4092, pp. 1-33 (2015).*
Pertot, I. et al., "Trichoderma atroviride SC1 prevents Phaemoniella chlamydospora and Phaeoacremonium aleophilum infection of grapevine plants during the grafting process in nurseries," BioControl, vol. 61, pp. 257-267 (2016).*
Waghunde, R.R. et al., "Trichoderma: A significant fungus for agriculture and environment," African Journal of Agricultural Research , vol. 11(22), pp. 1952-1965 (2016).*
Sholberg, A.P. et al., "Integrated management of stone fruit diseases," in: Integrated Management of Diseases Caused by Fungi, Phytoplasma, and Bacteria, Ciancio, A. et al. (eds.), 2008, pp. 3-25.*
International Search Report and Written Opinion dated Feb. 4, 2020 in International Application No. PCT/EP2019/083600.
International Preliminary Report on Patentability, dated Jun. 8, 2021, in International Application No. PCT/EP2019/083600.
Vintec® Safety Data Sheet; issued 2016; revised 2020.
ESQUIVE® WP, Agrauxine SA, France; 2019; a printout of the U.S. website of Agrauxine, SA (https://agrauxine.com/en/produit/esquive-wp/, downloaded Jul. 12, 2022.
REMEDIER, Isagro S.p.A, Italy; 2013; a printout of the U.S. website of the company (https://www.gowanco-nissanchem-eu.pl/en/product/remedier-2/, downloaded Jul. 12, 2022.
Bioten® WP, Gowan Company, Yuma, AZ, Product Data Sheet, Accepted Oct. 1, 2015.
Bachar, "Esquive WP a Bio fungicide against pruning wound diseases on vine and plant root pathogens", on URL: https://www.abim.ch/fileadmin/abim/documents/presentations2008/session4/5_Blal_ABIM-2008.pdf, published Oct. 31, 2008.
Sanz, L. et al., "Cell wall-degrading isoenzyme profiles of trichoderma biocontrol strains show correlation with rDNA taxonomic species", Current Genetics, vol. 46, pp. 277-286, published Oct. 9, 2004.
Woo, Sheridan et al., "Trichoderma-based products and their widespread use in agriculture," on URL: https://benthamopen.com/contents/pdf/TOMYCJ/TOMYCJ-8-71.pdf, published Jan. 1, 2014.
Biote® WP, Product Sheet, Amend Sep. 8, 2015, Accepted Oct. 1, 2015.

* cited by examiner

*Primary Examiner* — John Pak
(74) *Attorney, Agent, or Firm* — Knobbe, Martens, Olson & Bear LLP

(57) ABSTRACT

A method for preventing or combating a fungal infection on a stone fruit tree or a part thereof includes applying *Trichoderma atroviride* strain SC1 to the tree, the part thereof, or a locus of the tree. The *Trichoderma atroviride* strain SC1 is useful in the prevention or combat of a fungal infection on a stone fruit tree or a part thereof.

9 Claims, No Drawings

METHODS FOR TREATING A FUNGAL INFECTION ON A STONE FRUIT TREE

PRIORITY AND CROSS REFERENCE TO RELATED APPLICATIONS

This application is the U.S. National Stage Application under 35 U.S.C. § 371 of International Application No. PCT/EP2019/083600, filed Dec. 4, 2019, designating the U.S. and published in the English language as WO 2020/115097 A1 on Jun. 11, 2020, which claims the benefit of Belgium Patent Application No. BE 2018/5854, filed Dec. 4, 2018. Any and all applications for which a foreign or a domestic priority is claimed is/are identified in the Application Data Sheet filed herewith and is/are hereby incorporated by reference in their entirety under 37 C.F.R. § 1.57.

FIELD

The present invention is situated in the field of biological control agents against fungal infections. In particular, the invention relates to methods and uses for treating a fungal infection on stone fruit trees, such as peach trees, nectarine trees, plum trees, apricot trees or cherry trees, or parts thereof.

BACKGROUND

Stone fruits are produced for the fresh-fruit market or for processed-fruit. Stone fruits are grown successfully under a wide range of climatic and soil conditions.

Pre-harvest and post-harvest fungal diseases can cause heavy losses and their incidence may be influenced by various cultural practices such as proper irrigation, soil drainage, pruning, removing plant debris from the soil and minimizing mechanical injury to fruits during harvesting processes.

Although chemical treatment is still the most common fungal infection control method, strategies to reduce or abolish chemical application are recommended.

In view thereof, there remains a need in the art for further and/or improved methods for treating fungal infections on stone fruit trees or parts thereof such as on fruits.

SUMMARY

The present inventors realised that *Trichoderma* selected from the group consisting of *Trichoderma atroviride*, *Trichoderma asperellum*, and *Trichoderma gamsii* can be used as biocontrol agents against fungal infections on stone fruit trees or parts thereof. As shown in the experimental section, the application of *Trichoderma atroviride*, in particular *Trichoderma atroviride* SC1, on nectarine trees resulted in fungicidal effects on several fungal infections which spread naturally in the trial field. Advantageously, the fungicidal efficacy on leaves, flowers and/or shoots of stone fruit trees was comparable to or even better than conventionally used standards. No symptoms of phytotoxicity nor any negative effects on non-target organisms were detected during the whole trial.

Accordingly, provided herein is a method for preventing or combating a fungal infection on a stone fruit tree or a part thereof, the method comprising applying *Trichoderma* selected from the group consisting of *Trichoderma atroviride*, *Trichoderma asperellum*, and *Trichoderma gamsii* to the tree, the part thereof, or the locus of the tree.

Also provided herein is the use of *Trichoderma* selected from the group consisting of *Trichoderma atroviride*, *Trichoderma asperellum*, and *Trichoderma gamsii* in the prevention or combat of a fungal infection on a stone fruit tree or part thereof.

As shown in the example section, the results obtained with *Trichoderma atroviride* strain SC1 are unexpectedly superior to those obtained with other *Trichoderma* strains such as *Trichoderma atroviride* strain I-1237, or a combination of *Trichoderma asperellum* and *Trichoderma gamsii*.

Accordingly, a first aspect of the invention relates to a method for preventing or combating a fungal infection on a stone fruit tree or a part thereof, the method comprising applying *Trichoderma atroviride* strain SC1 to the tree, the part thereof, or the locus of the tree.

A related aspect of the invention provides the use of *Trichoderma atroviride* strain SC1 in the prevention or combat of a fungal infection on a stone fruit tree or part thereof.

The present methods and uses significantly reduce the pest incidence and pest severity of fungal infections which naturally spread into an orchard, and hence allow to increase the orchard's yield of stone fruits.

Those skilled in the art will recognize the many other effects and advantages of the present methods or uses, and the numerous possibilities for end uses (e.g., farmers) of the present invention from the detailed description and examples provided below.

DETAILED DESCRIPTION

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms also encompass "consisting of" and "consisting essentially of", which enjoy well-established meanings in patent terminology.

The recitation of numerical ranges by endpoints includes all numbers and fractions subsumed within the respective ranges, as well as the recited endpoints.

The terms "about" or "approximately" as used herein when referring to a measurable value such as a parameter, an amount, a temporal duration, and the like, are meant to encompass variations of and from the specified value, such as variations of ±10% or less, preferably ±5% or less, more preferably ±1% or less, and still more preferably ±0.1% or less of and from the specified value, insofar such variations are appropriate to perform in the disclosed invention. It is to be understood that the value to which the modifier "about" refers is itself also specifically, and preferably, disclosed.

Whereas the terms "one or more" or "at least one", such as one or more members or at least one member of a group of members, is clear per se, by means of further exemplification, the term encompasses inter alia a reference to any one of said members, or to any two or more of said members, such as, e.g., any 3 or more, 4 or more, 5 or more, 6 or more, or 7 or more etc. of said members, and up to all said members. In another example, "one or more" or "at least one" may refer to 1, 2, 3, 4, 5, 6, 7 or more.

The discussion of the background to the invention herein is included to explain the context of the invention. This is not to be taken as an admission that any of the material referred to was published, known, or part of the common general knowledge in any country as of the priority date of any of the claims.

Throughout this disclosure, various publications, patents and published patent specifications are referenced by an identifying citation. All documents cited in the present specification are hereby incorporated by reference in their entirety. In particular, the teachings or sections of such documents herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the invention. When specific terms are defined in connection with a particular aspect of the invention or a particular embodiment of the invention, such connotation is meant to apply throughout this specification, i.e., also in the context of other aspects or embodiments of the invention, unless otherwise defined.

In the following passages, different aspects or embodiments of the invention are defined in more detail. Each aspect or embodiment so defined may be combined with any other aspect(s) or embodiment(s) unless clearly indicated to the contrary. In particular, any feature indicated as being preferred or advantageous may be combined with any other feature or features indicated as being preferred or advantageous.

Reference throughout this specification to "one embodiment", "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

By extensive experimental testing, the present inventors realised that *Trichoderma* selected from the group consisting of *Trichoderma atroviride*, *Trichoderma asperellum*, and *Trichoderma gamsii* can be used as biocontrol agents against fungal infections on stone fruit trees or parts thereof. By extensive testing, the present inventors found that the results obtained with *Trichoderma atroviride* strain SC1 were unexpectedly superior to those obtained with other *Trichoderma* strains, such as *Trichoderma atroviride* I-1237 (e.g. ESQUIVE® WP, Agrauxine SA, France), or a combination of *Trichoderma asperellum* strain ICC 012 and *Trichoderma gamsii* strain ICC 080 (e.g. REMEDIER, Isagro S.p.A, Italy). Thus, the inventors realised that *Trichoderma atroviride* strain SC1 can be used as a particularly advantageous biocontrol agent against fungal infections on stone fruit trees or parts thereof.

Accordingly, a first aspect relates to a method for treating a fungal infection on a stone fruit tree or a part thereof, the method comprising applying *Trichoderma atroviride* strain SC1 to the tree, the part thereof, or the locus of the tree. Preferably, the method is an agricultural method.

The term "agricultural" as used herein refers to the activity or business of growing crops including stone fruits.

The phrases "preventing or combating a fungal infection" and "treating a fungal infection" may be used interchangeably herein, and encompass both the actual treatment of an already developed fungal infection, such as reducing, controlling, stabilizing, and suppressing an already developed fungal infection, as well as prophylactic or preventive measures, wherein the aim is to prevent or lessen the chances of incidence of a fungal infection, such as to prevent occurrence, development and progression of a fungal infection.

The terms "stone fruit tree" or "stone fruit producing tree" refers to a tree which is capable of producing stone fruits.

The term "tree" generally refers to any plant with the general form of an elongated stem, or trunk, which supports the photosynthetic leaves or branches at some distance above the ground. The term "tree" also encompasses shrubs, which are smaller trees with a height of 0.5 meter to 10 meters.

The phrase "part of a stone fruit tree" as used herein refers to any one or more of the leaves, the shoots, the branches, the flowers, the fruits, the stem, or the roots of a stone fruit tree.

In certain embodiments, the part of a stone fruit tree may be any one or more of the leaves, the shoots, the flowers, the branches, the fruits, the stem or the roots. In certain embodiments, the part of a stone fruit tree may be any one or more of the leaves, the shoots, the flowers, the branches, the stem or the roots. In certain embodiments, the part of a stone fruit tree may be any one or more of the leaves, the shoots, the flowers or the branches. In certain embodiments, the part of a stone fruit tree may be any one or more of the leaves, the shoots or the flowers.

In certain embodiments, the leaves, the shoots, the flowers, the branches, the fruits, the stem or the roots of the tree, when treated according to the methods as taught herein, may be attached to (e.g. growing on) the tree. Post-harvest methods of treating fruits are not included in the methods as taught herein.

The phrase "locus of a tree" as used herein refers to an area in close proximity of a tree. For instance, the locus of a tree may be a circular area around the stem of a tree such as a circular area having a diameter of at most 10 meters, for instance at most 5 meters, at most 4 meters, at most 3 meters, at most 2 meters, at most 1 meter, or at most 0.5 meter, around the stem of a tree.

In certain embodiments of the methods or uses as taught herein, the stone fruit tree may be selected from the group consisting of a tree of the genus *Prunus*, an olive tree, a coffee tree, a jujube tree, a mango tree, a palm tree, a pistachio tree, a white sapote tree, and a cashew tree. Preferably, the stone fruit tree is a tree of the genus *Prunus*.

In certain embodiments of the methods or uses as taught herein, the stone fruit tree may be a tree of the genus *Prunus* selected from the group consisting of a peach tree, a nectarine tree, a plum tree, a damson tree, a cherry tree, an apricot tree, an almond tree, and an ornamental tree of the genus *Prunus*.

In certain embodiments, the ornamental tree of the genus *Prunus* may be an ornamental cherry tree, also called Japanese cherry tree.

The terms "stone fruit" and "drupe" may be used interchangeably herein and refer to a fruit with a large stone or pit inside.

The terms "fungal infection" or "fungal disease" may be used interchangeably herein.

In certain embodiments of the methods or uses, as taught herein, the fungal infection is a fungal infection of stone fruit trees, such as a fungal infection naturally occurring on stone fruit trees.

In certain embodiments, the fungal infection may be a fungal infection of a tree of the genus *Prunus*, of an olive tree, of a coffee tree, of a jujube tree, of a mango tree, of a palm tree, of a pistachio tree, of a white sapote tree, or of a cashew tree. Preferably, the fungal infection is a fungal infection of a tree of the genus *Prunus*.

In certain embodiments, the fungal infection is a fungal infection of a tree of the genus *Prunus* selected from the group consisting of a peach tree, a nectarine tree, a plum tree, a damson tree, a cherry tree, an apricot tree, an almond tree, and an ornamental tree of the genus *Prunus*. For instance, the fungal infection may be a fungal disease of a peach tree, a nectarine tree or an apricot tree as provided in Table 1.

TABLE 1

Fungal diseases of peach, nectarine and/or apricot trees

| Fungal disease | Genus/species of fungus |
| --- | --- |
| Alternaria rot | *Alternaria alternate* |
| | *Alternaria* spp. |
| Anthracnose | *Colletotrichum gloeosporioides* |
| | *Glomerella cingulata* |
| | *Colletotrichum acutatum* |
| Armillaria crown and root rot | *Armillaria mellea* |
| | *Armillaria solidtpes* |
| | *Armillaria bulbosa* |
| | *Armillaria tabescens* |
| | = *Clitocybe tabescens* |
| Brown rot blossom blight and fruit rot | *Monilinia fructicola* |
| | *Monilinia laxa* |
| Ceratocystis canker | *Ceratocystis fimbriata* |
| Constriction canker = Fusicoccum canker, | *Phomopsis amygdali* |
| Phomopsis shoot blight | = *Fusicoccum amygdali* |
| Cytospora canker | *Leucostoma persoonii* |
| | *Cytospora leucostoma* |
| Gummosis (blister canker in Japan) | *Botryosphaeria dothidea* |
| | = *Botryosphaeria berengeriana* |
| | *Fusicoccum aesculi* |
| | *Botryosphaeria obtusa* |
| | *Botryosphaeria rhodina* |
| | *Botryosphaeria ribis* |
| Green fruit rot | *Botrytis cinerea* |
| | *Botryotinia fuckeliana* |
| | *Monilinia fructicola* |
| | *Monilinia laxa* |
| | *Sclerotinia sclerotiorum* |
| Leaf curl | *Taphrina deformans* |
| Phytophthora pruning wound canker | *Phytophthora syringae* |
| Scab | *Cladosporium carpophilum* |
| | = *Fusicladium carpophilum* |
| | *Venturia carpophila* |
| | *Cladosporium* spp. |
| Shot hole | *Wilsonomyces carpophilus* |
| | = *Stigmina carpophila* |
| Silver leaf | *Chondrostereum purpureum* |

In certain embodiments of the methods or uses as taught herein, the fungal infection may be selected from the group consisting of *Coryneum, Taphrina, Monilinia, Fusicoccum, Botrytis, Cladosporium, Cytospora, Dibotryon, Venturia, Blumeriella, Sphaerotheca, Podosphaera, Wilsonomyces, Apiognomonia, Chondrostereum, Botryosphaeria, Clitocybe, Armillaria, Alternaria, Colletotrichum, Glomerella, Ceratocystis, Leucostoma, Botgotinia,* and *Sclerotinia*.

In certain embodiments of the methods or uses as taught herein, the fungal infection may be selected from the group consisting of *Coryneum, Taphrina, Monilinia, Fusicoccum, Botrytis, Cladosporium, Cytospora, Dibotryon, Venturia, Blumeriella, Sphaerotheca, Podosphaera, Wilsonomyces, Apiognomonia, Chondrostereum, Botryosphaeria, Clitocybe,* and *Armillaria*.

In certain embodiments of the methods or uses as taught herein, fungal infection may be selected from the group consisting of *Coryneum beijerinckii, Taphrina deformans, Monilinia laxa, Monilinia fructicola* (Brown rot), *Monilinia fructigena, Fusicoccum amygdali, Botrytis cinerea, Cladosporium carpophilum* (Black spot or freckles), *Cytospora cincta, Cytospora leucostoma, Dibotryon morbosum* (synonym: *Apiosporina morbosa*) (Black knot), *Venturia carpophila* (Peach scab), *Blumeriella jaapii* (Cherry leafspot), *Sphaerotheca pannosa, Podosphaera tridactyla, Podosphaera clandestina, Taphrina pruni, Wilsonomyces carpophilus, Apiognomonia erythrostoma, Chondrostereum purpureum, Botryosphaeria dothidea, Clitocybe tabescens,* and *Armillaria mellea*.

In certain embodiments of the methods or uses as taught herein, the fungal infection may be selected from the group consisting of *Coryneum beijerinckii, Taphrina deformans, Monilinia laxa,* and *Fusicoccum amygdali*. Preferably, the fungal infection may be *Coryneum beijerinckii, Taphrina deformans,* or *Monilinia laxa*.

In certain embodiments, the methods as taught herein comprise applying (i.e. administering, putting on) *Trichoderma* selected from the group consisting of *Trichoderma atroviride, Trichoderma asperellum,* and *Trichoderma gamsii* to the tree, the part thereof, or the locus of the tree.

The *Trichoderma* as taught herein are advantageously used as biological pesticides or biopesticides, in particular as biological fungicides.

The *Trichoderma* may be selected from the group consisting of *Trichoderma atroviride, Trichoderma asperellum,* and *Trichoderma gamsii*.

The *Trichoderma* may be *Trichoderma atroviride*.

The *Trichoderma*, in particular the *Trichoderma atroviride*, may be selected from the group consisting of *Trichoderma atroviride* SC1, *Trichoderma atroviride* I-1237, *Trichoderma atroviride* T11, and *Trichoderma atroviride* IMI 206040.

The *Trichoderma*, in particular the *Trichoderma atroviride*, may be *Trichoderma atroviride* SC1.

The terms "*Trichoderma atroviride* strain SC1" or "*Trichoderma atroviride* SC1" may be used interchangeably.

*Trichoderma atroviride* strain SC1 has been deposited in 2007 under the Budapest Treaty at the CBS ("Centraalbureau voor Schimmelculturen") under No CBS 122089. This strain can be isolated and grown as described in WO 2009/116106.

*Trichoderma atroviride* SC1 is a mesophilic fungus as most *Trichoderma* spp. that belongs to the genus of fungi *Trichoderma*, which is present in all soils.

*Trichoderma atroviride* SC1 is able to utilize a wide range of products as sole carbon and nitrogen sources. Fungal growth in culture media is superior with some nitrogen sources such Yeast Extract, Nitrite, Tryptone, Peptone, Glutamine and Asparagine or some carbon sources such Mannose, Galactose, Sucrose, Malt Extract, Cellobiose, Glucose and Trehalose. *Trichoderma atroviride* SC1 survives in a temperature range from −1° C. to 30° C. and grows in a range of temperatures from 10° C. to 30° C. The optimal temperature for growth is 25° C.±1° C., although fungal radial growth at 20° C. is found not significantly different from the growth observed at 25° C. The maximum temperature for *Trichoderma atroviride* SC1 growth (30° C.) is lower than human body temperature, which is a good indication that this fungus is not pathogenic to humans. The pH tolerance levels of *Trichoderma atroviride* SC1 fall within the common range for *Trichoderma* strains, e.g. a pH range comprised from 3 to 10. The minimum limit of water activity tolerance of *Trichoderma atroviride* SC1 is 0.910. The preferred value of water activity is 0.998, which correspond to values of high relative humidity conditions preferred by most of the fungal plant pathogens. *Trichoderma atroviride* SC1 persists in soil at effective levels for long periods (more than one year).

*Trichoderma atroviride* SC1 can be detected as described in WO2009/116106, by achieving parallel amplification of Endochitinase 42 gene (ech42) GenBank Acc No AB041753.1 and of a G protein a subunit gene (tga3) GenBank Acc No AF452097.1 with suitable primer sets.

The *Trichoderma* may be *Trichoderma asperellum*.

The *Trichoderma*, in particular the *Trichoderma asperellum*, may be *Trichoderma asperellum* strain T34, or *Trichoderma asperellum* strain ICC012.

The *Trichoderma* may be *Trichoderma gamsii*

The *Trichoderma*, in particular the *Trichoderma gamsii*, may be *Trichoderma gamsii* strain ICC080.

The *Trichoderma* may be selected from the group consisting of *Trichoderma atroviride* SC1, *Trichoderma atroviride* I-1237, *Trichoderma atroviride* T11, *Trichoderma atroviride* IMI 206040, *Trichoderma asperellum* strain T34, *Trichoderma asperellum* strain ICC012, and *Trichoderma gamsii* strain ICC080.

The methods as taught herein may comprise applying *Trichoderma* strains selected from the group consisting of *Trichoderma atroviride* SC1, *Trichoderma atroviride* I-1237, *Trichoderma atroviride* T11, *Trichoderma atroviride* IMI 206040, *Trichoderma asperellum* strain T34, *Trichoderma asperellum* strain ICC012, and *Trichoderma gamsii* strain ICC080 to the tree, the part thereof, or the locus of the tree.

In certain embodiments of the methods or uses as taught herein, the *Trichoderma atroviride* SC1 may be applied in combination with one or more other fungicides that are non-toxic to the *Trichoderma atroviride* SC1.

In certain embodiments of the methods or uses as taught herein, the *Trichoderma atroviride* SC1, optionally in combination with one or more other fungicides that are non-toxic to the *Trichoderma atroviride* SC1, may be applied in a composition comprising one or more auxiliaries. Suitable auxiliaries include one or more of supplements; additives; solid carriers such as minerals; solvents, such as water; thickeners; adjuvants such as spray adjuvants; emulsifiers; dispersants; plant nutrients; micro-nutrients; wetting agents such as polyoxyethylene sorbitan monooleate (Tween 80™); lecithin; saponins; UV protectors; antioxidants; and diluents.

The terms "composition", "formulation", or "preparation" may be used interchangeably herein and refer to a mixture of one or more auxiliaries and *Trichoderma* selected from the group consisting of *Trichoderma atroviride*, *Trichoderma asperellum*, and *Trichoderma gamsii*, such as *Trichoderma atroviride* SC1.

The terms "active ingredient" or "active component" can be used interchangeably and broadly refer to a substance or composition which, when provided in an effective amount, achieves a desired outcome. Typically, an active ingredient as intended herein may achieve such outcome(s) through interacting with and/or modulating the stone fruit tree, part thereof or locus of the tree.

In certain embodiments of the methods or uses, as taught herein, the compositions as taught herein may be formulated for use as an agricultural composition. The compositions may be in solid, semi-liquid or liquid form. Of particular interest are compositions in liquid form.

In certain embodiments of the methods or uses as taught herein, the composition may be a sprayable liquid.

Preferably, *Trichoderma* selected from the group consisting of *Trichoderma atroviride*, *Trichoderma asperellum*, and *Trichoderma gamsii*, such as in particular *Trichoderma atroviride* SC1, is present in the composition as taught herein in an effective amount.

In certain embodiments of the methods or uses as taught herein, the *Trichoderma atroviride* SC1 may be present in the composition in an amount of from $1 \times 10^6$ CFU/L to $1 \times 10^{14}$ CFU/L, or from $1 \times 10^7$ CFU/L to $1 \times 10^{13}$ CFU/L, or from $1 \times 10^8$ CFU/L to $1 \times 10^{13}$ CFU/L, or from $1 \times 10^9$ CFU/L to $1 \times 10^{13}$ CFU/L, or from $1 \times 10^{10}$ CFU/L to $1 \times 10^{13}$ CFU/L.

In certain embodiments of the methods or uses as taught herein, the *Trichoderma atroviride* SC1 may be applied in an amount of from $1 \times 10^9$ CFU/ha to $1 \times 10^{14}$ CFU/ha, such as in an amount of from $1 \times 10^{10}$ CFU/ha to $1 \times 10^{13}$ CFU/ha or in an amount of from $1 \times 10^{10}$ CFU/ha to $1 \times 10^{12}$ CFU/ha.

In certain embodiments of the methods or uses as taught herein, the *Trichoderma atroviride* SC1 may be applied in an amount of from $1 \times 10^{11}$ CFU/ha to $1 \times 10^{13}$ CFU/ha.

In certain embodiments, the *Trichoderma atroviride* SC1 or the composition as taught herein may be applied to the tree, part thereof, or locus of the tree, present on the field.

The terms "field" or "agricultural field" may be used interchangeably herein and refers to an area of land used for agricultural purposes such as cultivating crops or cultivating orchard trees.

The term "orchard" as used herein refers to a field planted with orchard trees such as fruit trees (e.g., stone fruit trees).

In certain embodiments, the *Trichoderma atroviride* SC1 or the composition as taught herein may be applied to the part of the tree, such as to a fruit, when the part of the tree, such as the fruit, is present on or attached to (e.g. is growing on) the tree.

In certain embodiments, the *Trichoderma atroviride* SC1 or the composition as taught herein may be applied to any one or more of the leaves, the shoots, the flowers, the branches, the fruits, the stem or the roots of the tree. In certain embodiments of the methods or uses as taught herein, the *Trichoderma atroviride* SC1 or the composition as taught herein may be applied to (e.g., sprayed on) the whole of the above-ground part of the tree. Accordingly, in certain embodiments, the *Trichoderma atroviride* SC1 or the composition as taught herein may be applied to (e.g., sprayed on) any one or more of the leaves, the shoots, the flowers, the branches, the fruits or the stem of the tree. In certain embodiments, the *Trichoderma atroviride* SC1 or the composition as taught herein may be applied to (e.g., sprayed on) any one or more of the leaves, the shoots, the flowers or the branches of the tree. Preferably, the *Trichoderma atroviride* SC1 or the composition as taught herein may be applied to (e.g., sprayed on) any one or more of the leaves, the shoots or the flowers of the tree. In certain embodiments, the *Trichoderma atroviride* SC1 or the composition as taught herein may be applied to (e.g., sprayed on) the leaves of the tree.

Hence, an aspect provides a method for preventing or combating a fungal infection on a stone fruit tree or a part thereof, the method comprising applying *Trichoderma atroviride* SC1 to any one or more of the leaves, the shoots or the flowers of the tree.

In certain embodiments, sprayable liquids may be applied by spraying the tree, part thereof, or locus of the tree by conventional spraying equipment as known in the art, such as airplanes, backpack sprayers, tractor mounted boom sprayers etc.

In certain embodiments, the application may be single application or frequent (multiple) applications, at the same or varying time intervals.

In certain embodiments, the *Trichoderma atroviride* SC1 or the composition as taught herein may be applied (e.g., by spraying) year-round to the tree, part thereof, or locus of the tree, e.g. may be applied during any one or more of spring season, summer season, autumn season or winter season. Preferably, the *Trichoderma atroviride* SC1 or the composition as taught herein may be applied (e.g., by spraying) to the tree, part thereof, or locus of the tree during spring. Such application advantageously allows to prevent and/or reduce the occurrence of fungal diseases on stone fruit trees and on the stone fruits growing (later during the year) on the tree.

In certain embodiments, the *Trichoderma atroviride* SC1 or the composition as taught herein may be applied (e.g., by spraying) to the tree, part thereof, or locus of the tree at a temperature (e.g. air temperature) in the range from −1° C. to 30° C. In certain embodiments, the *Trichoderma atroviride* SC1 or the composition as taught herein may be applied (e.g., by spraying) to the agricultural crop residue at a temperature in the range from 0° C. to 30° C., from 1° C. to 30° C., from 5° C. to 25° C., or from 10° C. to 20° C.

A further aspect relates to the use of *Trichoderma atroviride* SC1 in the treatment of a fungal infection on a stone fruit tree or part thereof.

The present application also provides aspects and embodiments as set forth in the following Statements:

Statement 1. A method for preventing or combating a fungal infection on a stone fruit tree or a part thereof, the method comprising applying *Trichoderma* selected from the group consisting of *Trichoderma atroviride, Trichoderma asperellum*, and *Trichoderma gamsii* to the tree, the part thereof, or the locus of the tree.

Statement 2. The method according to statement 1, wherein the stone fruit tree is selected from the group consisting of a tree of the genus *Prunus*, an olive tree, a coffee tree, a jujube tree, a mango tree, a palm tree, a pistachio tree, a white sapote tree, and a cashew tree; preferably wherein the stone fruit tree is a tree of the genus *Prunus.*

Statement 3. The method according to statement 1 or 2, wherein the stone fruit tree is a tree of the genus *Prunus* selected from the group consisting of a peach tree, a nectarine tree, a plum tree, a damson tree, a cherry tree, an apricot tree, an almond tree, and an ornamental tree of the genus *Prunus.*

Statement 4. The method according to any one of statements 1 to 3, wherein the fungal infection is selected from the group consisting of *Coryneum, Taphrina, Monilinia, Fusicoccum, Botrytis, Cladosporium, Cytospora, Dibotryon, Venturia, Blumeriella, Sphaerotheca, Podosphaera, Wilsonomyces, Apiognomonia, Chondrostereum, Botryosphaeria, Clitocybe*, and *Armillaria.*

Statement 5. The method according to any of one statements 1 to 4, wherein the fungal infection is selected from the group consisting of *Coryneum beijerinckii, Taphrina deformans, Monilinia laxa, Monilinia fructicola* (Brown rot), *Monilinia fructigena, Fusicoccum amygdali, Botrytis cinerea, Cladosporium carpophilum* (Black spot or freckles), *Cytospora cincta, Cytospora leucostoma, Dibotryon morbosum* (synonym: *Apiosporina morbosa*) (Black knot), *Venturia carpophila* (Peach scab), *Blumeriella jaapii* (Cherry leafspot), *Sphaerotheca pannosa, Podosphaera tridactyla, Podosphaera clandestina, Taphrina pruni, Wilsonomyces carpophilus, Apiognomonia erythrostoma, Chondrostereum purpureum, Botryosphaeria dothidea, Clitocybe tabescens*, and *Armillaria mellea.*

Statement 6. The method according to any one of statements 1 to 5, wherein the fungal infection is selected from the group consisting of *Coryneum beijerinckii, Taphrina deformans, Monilinia laxa*, and *Fusicoccum amygdali.*

Statement 7. The method according to any one of statements 1 to 6, wherein the *Trichoderma* is applied in combination with one or more other pesticides that are non-toxic to the *Trichoderma.*

Statement 8. The method according to any one of statements 1 to 7, wherein the *Trichoderma*, optionally in combination with one or more other pesticides that are non-toxic to the *Trichoderma*, is applied in a composition comprising one or more auxiliaries.

Statement 9. The method according to statement 8, wherein the composition is a sprayable liquid.

Statement 10. The method according to any one of statements 1 to 9, wherein the *Trichoderma* is applied to the whole of the above-ground part of the tree, preferably wherein the *Trichoderma* is applied to any one or more of the leaves, the shoots or the flowers of the tree.

Statement 11. The method according to any one of statements 8 to 10, wherein the *Trichoderma* is present in the composition in an amount of from $1\times10^{6}$ CFU/L to $1\times10^{14}$ CFU/L, or from $1\times10^{7}$ CFU/L to $1\times10^{13}$ CFU/L, or from $1\times10^{8}$ CFU/L to $1\times10^{13}$ CFU/L, or from $1\times10^{9}$ CFU/L to $1\times10^{13}$ CFU/L, or from $1\times10^{10}$ CFU/L to $1\times10^{13}$ CFU/L.

Statement 12. The method according to any one of statements 1 to 11, wherein the *Trichoderma* is applied in an amount of from $1\times10^{9}$ CFU/ha to $1\times10^{14}$ CFU/ha, or wherein the *Trichoderma* is applied in an amount of from $1\times10^{11}$ CFU/ha to $1\times10^{13}$ CFU/ha.

Statement 13. The method according to any one of statements 1 to 12, wherein the *Trichoderma atroviride* is selected from the group consisting of *Trichoderma atroviride* SC1, *Trichoderma atroviride* I-1237, *Trichoderma atroviride* T11, and *Trichoderma atroviride* IMI 206040.

Statement 14. The method according to any one of statements 1 to 13, wherein the *Trichoderma atroviride* is *Trichoderma atroviride* strain SC1.

Statement 15. The method according to any one of statements 1 to 14, wherein the *Trichoderma asperellum* is *Trichoderma asperellum* strain T34, or *Trichoderma asperellum* strain ICC012.

Statement 16. The method according to any one of statements 1 to 15, wherein the *Trichoderma gamsii* is *Trichoderma gamsii* strain ICC080.

Statement 17. Use of *Trichoderma* selected from the group consisting of *Trichoderma atroviride, Trichoderma asperellum*, and *Trichoderma gamsii* in the prevention or combat of a fungal infection on a stone fruit tree or part thereof.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as follows in the spirit and broad scope of the appended claims.

The herein disclosed aspects and embodiments of the invention are further supported by the following non-limiting examples.

EXAMPLES

Example 1: Study of the Efficacy and Selectivity of *Trichoderma atroviride* Strain SC1 Against *Fusicoccum amygdali, Coryneum Beijerinckii, Monilinia laxa* and *Taphrina deformans* on Peach Trees of the Variety "Alitop"

The trial was aimed at evaluating the efficacy and selectivity of *Trichoderma atroviride* SC1 ($1 \times 10^{13}$ active conidia/kg, water dispersible granules (WG or WDG)) against the main diseases of peach, namely *Fusicoccum amygdali, Coryneum beijerinckii, Monilinia laxa* and *Taphrina deformans*. The trial was carried out near Budrio, in Bologna province (Emilia Romagna region, Italy) in a farm representative of that area in terms of crops and cultivation techniques. "Alitop" was the variety of peach (nectarine) chosen for the present trial, transplanted in 2013.

The use according to an embodiment of the invention of a composition comprising *Trichoderma atroviride* SC1 (referred to herein as "BCP511B") was compared to the reference standards Merpan 80 WDG (captan, 80%, WG) and Patrol Blu (copper, 35%, wettable powder (WP)). The treatments' list is presented in Table 2.

TABLE 2

Treatments according to embodiments of the invention and using reference standards

| Treatment number | Treatment name | Concentration | Type | Rate | Application Code | Comment |
|---|---|---|---|---|---|---|
| 1 | Untreated | | | | | |
| 2 | Merpan 80 WDG | 80% | WG | 300 g/100 l | ABCD | Water volume as in local practice 800-1000 L/ha |
| 3 | PATROL BLU | 35% | WP | 800 g/100 l | ABCD | Water volume as in local practice 800-1000 L/ha |
| 4 | BCP511B | 150 gA/L | WG | 50 g/ha | ABCD | Water volume as in local practice 800-1000 L/ha |
| 5 | BCP511B | 150 gA/L | WG | 100 g/ha | ABCD | Water volume as in local practice 800-1000 L/ha |
| 6 | BCP511B | 150 gA/L | WG | 200 g/ha | ABCD | Water volume as in local practice 800-1000 L/ha |

The target diseases *Taphrina deformans* (TAPHDE), *Monilinia laxa* (MONILA) and *Coryneum* sp. (CORNSP) spread naturally in the trial field, with no need of artificial inoculation. The weather conditions which occurred throughout the course of the trial ranged within the seasonal averages. The crop during the trial, never showed any symptoms of stress caused by unfavourable weather conditions or shortages of water or nutrients. The experimental design was a Randomized Complete Block (RCB) with 4 replicates; each plot was made by 3 plants (2.8 m of distance within row; 4 m of row spacing), for a total surface of 36.3 m².

Four applications were executed. The application method was spraying (broadcast—foliar) and the timing was according to crop stage: A: on day 0 at 51 BBCH of the crop, B: on day 21 at 57 BBCH, C: on day 46 at 65 BBCH and D: on day 56 at 69 BBCH of crop. BBCH uniform plant stages for stone fruit are as follows: BBCH 51: Inflorescence buds swelling: buds closed, light brown scales visible; BBCH 57: Sepals open; petal tips visible; single flowers with white/pink petals (closed); BBCH 65: Full flowering: at least 50% of flowers open, first petals falling; BBCH 69: End of flowering: all petals fallen. The application equipment type was a track sprayer. The operation pressure was 4 bar; the nozzle type hollow cone.

The assessments have been executed:

At 14 days after application D (DA-D) for TAPHDE, by evaluating the percentage of infected leaves on 10 marked shoots (pest incidence);

At 7 days after application C (DA-C) and 25 DA-D for MONILA, by evaluating the percentage of infected flower clusters on 50 flower clusters per plot (10 flower clusters on 5 branches per plot) and the percentage of infected shoots on 2 trees per plot;

At 20, 40 and 60 DA-D for CORNSP, by evaluating the pest severity (%) and pest incidence (%) on leaves and the pest incidence (%) on fruits.

The presence of any symptoms of phytotoxicity due to the experimental products has been evaluated at 7 and 21 days after application A (DA-A), 7 and 25 days after application B (DA-B), 7 DA-C and 7 DA-D.

The fungicide efficacy was calculated on pest incidence and on pest severity, by adopting the Abbott formula.

Efficacy Results on *Taphrina deformans*

14 DA-D, 73 BBCH of Crop

The untreated check scored an average percentage of infected leaves (pest incidence) equal to 29.5%. All treatments resulted different from such outcome. The highest fungicide efficacy was recorded by treatment 6 (BCP511B at 200 g/ha) with a pest incidence value of 1.5% (94.9% of efficacy), different from treatment 5 (BCP511B at 100 g/ha) that scored 4.0% of pest incidence (86.4% of efficacy), in turn different from treatment 2 (Merpan 80 WDG at 300 g/100 L) with 5.7% of pest incidence (80.5% of efficacy). Then treatment 3 (Patrol Blu at 800 g/100 L) recorded 14.2% of pest incidence (51.7% of efficacy) and finally treatment 4 (BCP511B at 50 g/ha) provided the lowest fungicide efficacy, showing 19.0% of pest incidence (35.3% of efficacy).

Efficacy Results on *Monilinia laxa*

7 DA-C, 67 BBCH of Crop

The untreated check scored 41.0% of infected flower clusters (pest incidence, %). All treatments resulted different from such outcome. The highest fungicide efficacy was recorded by treatment 6 (BCP511B at 200 g/ha) with a pest incidence value of 8.0% (79.4% of efficacy). Treatment 2 (Merpan 80 WDG at 300 g/100 L) showed a higher pest incidence value, equal to 18.0% (54.1% of efficacy). Treatment 3 (Patrol Blu at 800 g/100 L) and treatment 5 (BCP511B at 100 g/ha) scored 25.0% and 26.0% of pest incidence respectively (efficacy of 38.4% and 35.2% respectively). Finally, treatment 4 (BCP511B at 50 g/ha) showed the highest pest incidence with 31.0% (22.8% of efficacy).

25 DA-D, 75 BBCH of Crop

The untreated check scored 41.6% of infected shoots (pest incidence, %). All treatments resulted different from such outcome. The highest fungicide efficacy was recorded by treatment 6 (BCP511B at 200 g/ha) with a pest incidence value of 4.5% (89.0% of efficacy), statistically comparable to treatment 2 (Merpan 80 WDG at 300 g/100 L) that recorded 10.4% of pest incidence with 73.3% of calculated efficacy. Finally, the remaining treatments provided higher and comparable pest incidence values, ranging from 26.2% to 30.5% (26.1%-36.6% of efficacy, i.e. an efficacy of 31.9% for treatment 3, an efficacy of 26.1% for treatment 4, and an efficacy of 36.6% for treatment 5).

Efficacy Results on *Coryneum* sp.

20 DA-D, 75 BBCH of Crop

On leaves, the untreated check scored an average pest incidence value equal to 6.8%. All treatments resulted different from such outcome with the exception of treatment 4 (BCP511B at 50 g/ha).

The highest fungicide efficacy was provided by treatment 6 (BCP511B at 200 g/ha) with 0.0% of pest incidence (100.0% of efficacy), anyway statistically comparable to the remaining treatments 2, 3, 5 and 6 which showed pest incidence values comparable and ranging from 0.3% to 2.0%.

In terms of pest severity, the untreated check recorded an average value of 0.34%. Treatment 4 resulted comparable to such outcome with 0.20%, while the remaining treatments resulted different from the untreated control but comparable among themselves with pest severity values ranging from 0.00% to 0.10%.

On fruits, at this assessment, the target disease wasn't yet observed (pest incidence and pest severity of 0.0%).

40 DA-D, 76 BBCH of Crop

On leaves, the untreated check scored an average pest incidence value equal to 29.0%. All treatments resulted different from such outcome.

The highest fungicide efficacy was provided by treatment 6 (BCP511B at 200 g/ha) with 4.8% of pest incidence (82.9% of efficacy), statistically comparable to treatment 2 (Merpan 80 WDG at 300 g/100 L) that scored 6.5% of pest incidence (76.1% of efficacy) and treatment 3 (Patrol Blu at 800 g/100 L) with pest incidence equal to 10.3% (64.7% of efficacy). Treatment 5 recorded an intermediate value of 12.3% of pest incidence (57.2% of efficacy) and finally treatment 4 recorded the highest pest incidence value, equal to 17.0% (40.9% of efficacy).

In terms of pest severity on leaves, the untreated check scored an average value equal to 3.68%. All treatments resulted different from such outcome. Again treatment 6 obtained the lowest outcome with 0.24% of pest severity, comparable to treatment 2 with 0.56%, in turn comparable to treatment 3 with 0.88%. Then treatment 5 scored 1.65% of pest severity, different from treatment 4 with 2.53%.

On fruits, the untreated check recorded an average pest incidence value of 12.5%. All treatments resulted different from such outcome. Treatment 6 (BCP511B at 200 g/ha) provided the lowest pest incidence (0.0% and 100.0% of efficacy), statistically comparable to treatment 2 (Merpan 80 WDG at 300 g/100 L) that scored 0.8% of pest incidence (94.6% of efficacy). The remaining treatments provided higher pest incidence values and resulted comparable among themselves (from 3.8% to 5.3%).

60 DA-D, 78 BBCH of Crop

On leaves, the untreated check scored an average pest incidence value equal to 60.8%. All treatments resulted different from such outcome.

The highest fungicide efficacy was again provided by treatment 6 (BCP511B at 200 g/ha) with 6.3% of pest incidence (90.0% of efficacy), statistically comparable to treatment 2 (Merpan 80 WDG at 300 g/100 L) that scored 9.0% of pest incidence (84.8% of efficacy), followed by treatment 3 (Patrol Blu at 800 g/100 L) with 20.5% (65.0% of efficacy). Treatment 5 (BCP511B at 100 g/ha) showed an intermediate pest incidence value of 26.5% (55.8% of efficacy) and finally treatment 4 (BCP511B at 50 g/ha) obtained the highest pest incidence value with 31.8% (46.0% of efficacy).

In terms of pest severity on leaves, the untreated check scored an average pest severity value equal to 7.3%. All treatments resulted different from such outcome. Again treatment 6 obtained the lowest outcome with 0.5% of pest severity, comparable to treatment 2 with 0.7%. The remaining treatments showed higher pest severity values ranging from 2.7% to 3.5%, without statistical difference among them.

On fruits, the untreated check scored 24.0% of pest incidence. All treatments resulted different from such outcome. Treatment 6 (BCP511B at 200 g/ha) scored the highest fungicide efficacy showing a pest incidence values of 0.8% (efficacy of 96.9%), anyway statistically comparable to treatment 2 (Merpan 80 WDG at 300 g/100 L) and to treatment 3 (Patrol Blu at 800 g/100 L) with 2.8% and 5.5% respectively (87.5% and 77.7% of efficacy). Then treatment 5 (BCP511B at 100 g/ha) obtained 6.8% of pest incidence (efficacy of 71.9%), different from treatment 4 (BCP511B at 50 g/ha) with 12.3% of pest incidence (49.1% of efficacy).

Concerning *Fusicoccum amygdali*, no symptoms were registered during the course of the trial.

Conclusions

From the data gathered at the end of the trial it can be concluded that:

BCP511B applied at the higher rate of 200 g/ha at timings A, B, C, D provided in general the highest fungicide efficacy against the target diseases *Taphrina deformans*, *Monilinia laxa* and *Coryneum* spp., being always comparable to the conventional standard Merpan 80 WDG applied at 300 g/100 L at timings A, B, C, D against *Monilinia laxa* and *Coryneum* spp. and even better than Merpan 80 WDG against *Taphrina deformans*;

In addition, an interesting fungicide behaviour was provided by the medium rate (100 g/ha) of BCP511B against *Taphrina deformans*, providing a final higher efficacy in comparison to the conventional standards Merpan 80 WDG and Patrol Blu;

A dose effect was observed for BCP511B, with the higher rate being superior to the medium and to the lower rates;

Finally, no symptom of phytotoxicity nor any negative effect on non-target organisms were detected at all during the whole trial period.

In conclusion, the application according to an embodiment of the invention of a composition comprising *Trichoderma atroviride* SC1 (applied at a concentration not causing any signs of phytotoxicity) resulted in a pest incidence and/or pest severity of *Taphrina deformans*, *Coryneum* species, and *Monilinia laxa* on leaves, flowers and shoots of nectarine trees of the variety Alitop which was comparable to or lower than (and hence the efficacy was comparable to or higher than) the pest incidence and/or pest severity obtained after application of reference standards, in particular Merpan 80 WDG (captan, 80%, WG) and Patrol Blu (copper, 35%, WP).

Example 2: Study of the Efficacy and Selectivity of *Trichoderma atroviride* Strain SC1 Against *Fusicoccum amygdali, Coryneum Beijerinckii, Monilinia Laxa* and *Taphrina deformans* on Peach Trees of the Variety "Maria Anna"

This trial was aimed at evaluating the efficacy and selectivity of *Trichoderma atroviride* SC1 ($1 \times 10^{13}$ active conidia/kg, WG) against the main diseases of peach, namely *Fusicoccum amygdali, Coryneum beijerinckii, Monilinia laxa* and *Taphrina deformans*. The trial was carried out near Budrio, in Bologna province (Emilia Romagna region, Italy) in a farm representative of that area in terms of crops and cultivation techniques. "Maria Anna" was the variety of peach (nectarine) chosen for the present trial, transplanted in 2013.

The use according to an embodiment of the invention of a composition comprising *Trichoderma atroviride* SC1 (referred to herein as "BCP511B") was compared to the reference standards Merpan 80 WDG (captan, 80%, WG) and Patrol Blu (copper, 35%, WP). The treatments' list is the same as in Table 2, provided in Example 1.

The target diseases *Taphrina deformans* (TAPHDE), *Monilinia laxa* (MONILA) and *Coryneum* sp. (CORNSP) spread naturally in the trial field, with no need of artificial inoculation. The weather conditions which occurred throughout the course of the trial ranged within the seasonal averages. The crop during the trial, never showed any symptoms of stress caused by unfavourable weather conditions or shortages of water or nutrients. The experimental design was a RCB with four replicates; each plot was made by 3 plants (2.8 m of distance within row; 4 m of row spacing), for a total surface of 36.3 m².

Four applications were executed. The application method was spraying (broadcast—foliar) and the timing was according to crop stage: A: on day 0 at 51 BBCH of the crop, B: on day 21 at 57 BBCH, C: on day 46 at 65 BBCH and D: on day 56 at 69 BBCH of crop. BBCH uniform plant stages for stone fruit are as known in the art and described in Example 1. The application equipment type was a track sprayer. The operation pressure was 4 bar; the nozzle type hollow cone.

The assessments have been executed:
- At 14 days after application D (DA-D) for TAPHDE, by evaluating the percentage of infected leaves on 10 marked shoots (pest incidence);
- At 7 days after application C (DA-C) and 25 DA-D for MONILA, by evaluating the percentage of infected flower clusters on 50 flower clusters per plot (10 flower clusters on 5 branches per plot) and the percentage of infected shoots on 2 trees per plot;
- At 20, 40 and 60 DA-D for CORNSP, by evaluating the pest severity (%) and pest incidence (%) on leaves and the pest incidence (%) on fruits.

The presence of any symptoms of phytotoxicity due to the experimental products has been evaluated at 7 and 21 days after application A (DA-A), 7 and 25 days after application B (DA-B), 7 DA-C and 7 DA-D.

The fungicide efficacy was calculated on pest incidence and on pest severity, by adopting the Abbott formula.

Efficacy Results on *Taphrina deformans*
14 DA-D, 73 BBCH of Crop

The untreated check scored an average percentage of infected leaves (pest incidence) equal to 17.9%. All treatments resulted different from such outcome. The highest fungicide efficacy was recorded by treatment 6 (BCP511B at 200 g/ha) with a pest incidence value of 1.4% (92.2% of efficacy). Treatment 5 (BCP511B at 100 g/ha) scored 3.1% of pest incidence (82.9% of efficacy), and treatment 2 (Merpan 80 WDG at 300 g/100 L) scored 5.1% of pest incidence (71.3% of efficacy). Then, treatment 3 (Patrol Blu at 800 g/100 L) recorded 9.8% of pest incidence (45.2% of efficacy) and finally treatment 4 (BCP511B at 50 g/ha) provided the lowest fungicide efficacy, showing 12.7% of pest incidence (29.2% of efficacy).

Efficacy Results on *Monilinia laxa*
7 DA-C, 67 BBCH of Crop

The untreated check scored 30.0% of infected flower clusters (pest incidence, %). Only treatment 6 and treatment 2 resulted different from such outcome. The highest fungicide efficacy was recorded by treatment 6 (BCP511B at 200 g/ha) with a pest incidence value of 5.0% (83.1% of efficacy). Treatment 2 (Merpan 80 WDG at 300 g/100 L) showed a slightly higher pest incidence value, equal to 11.0% (64.7% of efficacy). The remaining treatments provided higher pest incidence values (from 20.0% to 22.0%) with an efficacy of 28.3% for treatment 3, an efficacy of 30.8% for treatment 4, and an efficacy of 32.8% for treatment 5.

25 DA-D, 75 BBCH of Crop

The untreated check scored 26.1% of infected shoots (pest incidence, %). All treatments resulted different from such outcome. The highest fungicide efficacy was recorded by treatment 6 (BCP511B at 200 g/ha) with a pest incidence value of 1.9% (91.5% of efficacy), statistically comparable to treatment 2 (Merpan 80 WDG at 300 g/100 L) that recorded 4.6% of pest incidence with 81.1% of calculated efficacy. Finally, the remaining treatments provided higher and comparable pest incidence values, ranging from 15.1% to 18.1% (28.6%-41.2% of efficacy, i.e. an efficacy of 41.2% for treatment 3, an efficacy of 28.6% for treatment 4, and an efficacy of 32.8% for treatment 5).

Efficacy Results on *Coryneum* sp.
20 DA-D, 75 BBCH of Crop

At this assessment, the target disease did not yet appear (pest incidence and pest severity of 0.0%).

40 DA-D, 76 BBCH of Crop

On leaves, the untreated check scored an average pest incidence value equal to 6.0%. All treatments resulted different from such outcome. The highest fungicide efficacy was provided by treatment 6 (BCP511B at 200 g/ha) with only 0.3% of pest incidence (97.2% of efficacy), statistically comparable to treatment 2 (Merpan 80 WDG at 300 g/100 L) that scored 0.8% of pest incidence (89.4% of efficacy), followed by treatment 3 (Patrol Blu at 800 g/100 L) with pest incidence equal to 2.0% (62.9% of efficacy). Treatment 5 recorded 3.0% of pest incidence (53.5% of efficacy) and finally treatment 4 (BCP511B at 50 g/ha) recorded 5.0% of pest incidence (21.0% of efficacy), comparable to the untreated control.

In terms of pest severity on leaves, the untreated check scored an average value equal to 0.4%. All treatments resulted different from such outcome. Again treatment 6 obtained the lowest outcome with 0.01% of pest severity, comparable to treatment 2 with 0.04%. The remaining treatments showed intermediate pest severity values ranging from 0.13% to 0.25%, without statistical difference among them.

On fruits, no symptoms due to the target disease were yet observed.

60 DA-D, 78 BBCH of Crop

On leaves, the untreated check scored an average pest incidence value equal to 11.0%. All treatments resulted different from such outcome.

The highest fungicide efficacy was again provided by treatment 6 (BCP511B at 200 g/ha) with 1.8% of pest incidence (84.8% of efficacy), statistically comparable to treatment 2 (Merpan 80 WDG at 300 g/100 L) that scored 2.5% of pest incidence (73.8% of efficacy). The remaining treatments showed higher pest incidence values, ranging from 5.5% to 8.0%, comparable among themselves (27.0%-52.0% of efficacy, i.e. an efficacy of 52.0% for treatment 3, an efficacy of 27.0% for treatment 4, and an efficacy of 33.5% for treatment 5).

In terms of pest severity on leaves, the untreated check scored an average pest severity value equal to 0.80%. All treatments resulted different from such outcome. Again treatment 6 obtained the lowest outcome with 0.09% of pest severity, comparable to treatment 2 with 0.11%. The remaining treatments showed higher pest severity values ranging from 0.28% to 0.39%, without statistical difference among them.

On fruits, the untreated check scored 3.8% of pest incidence. All treatments resulted different from such outcome. Treatment 6 (BCP511B at 200 g/ha) and treatment 2 (Merpan 80 WDG at 300 g/100 L) scored the highest fungicide efficacy showing no infected fruits, with pest incidence values of 0% (efficacy of 100%), comparable to treatment 5 (BCP511B at 100 g/ha) with a pest incidence value of 0.5% (efficacy of 88.8%). Treatment 3 (Patrol Blu at 800 g/100 L) scored an intermediate pest incidence value of 0.8% (80.4% of efficacy) and finally treatment 4 (BCP511B at 50 g/ha) recorded 1.5% of pest incidence (62.1% of efficacy).

Concerning *Fusicoccum amygdali* no symptoms were registered during the course of the trial.

Conclusions

From the data gathered at the end of the trial it can be concluded that:

BCP511B applied at the higher rate of 200 g/ha at timings A, B, C, D provided in general the highest fungicide efficacy against the target diseases *Taphrina deformans*, *Monilinia laxa* and *Coryneum* spp., being always comparable to the conventional standard Merpan 80 WDG applied at 300 g/100 L at timings A, B, C, D against *Monilinia laxa* and *Coryneum* spp. and even better than Merpan 80 WDG against *Taphrina deformans*;

In addition, an interesting fungicide behaviour was provided by the medium rate (100 g/ha) of BCP511B against *Taphrina deformans*, providing a final higher efficacy in comparison to the conventional standards Merpan 80 WDG and Patrol Blu;

A dose effect was observed for BCP511B, with the higher rate being superior to the medium and to the lower rates;

Finally, no symptoms of phytotoxicity nor any negative effect on non-target organisms were detected at all during the whole trial period.

In conclusion, the application according to an embodiment of the invention of a composition comprising *Trichoderma atroviride* SC1 (applied at a concentration not causing any signs of phytotoxicity) resulted in a pest incidence and/or pest severity of *Taphrina deformans*, *Coryneum* species, and *Monilinia laxa* on leaves, flowers and shoots of nectarine trees of the variety Maria Anna which was comparable to or lower than (and hence the efficacy was comparable to or higher than) the pest incidence and/or pest severity obtained after application of reference standards, such as Merpan 80 WDG (captan, 80%, WG) and Patrol Blu (copper, 35%, WP).

Example 3: Study of the Efficacy and Selectivity of *Trichoderma atroviride* Strain SC1 Against *Monilinia laxa* and *Coryneum* sp. on Apricot Trees (Variety "Mogador")

This trial was aimed at evaluating the efficacy and selectivity of *Trichoderma atroviride* SC1 ($1 \times 10^{13}$ active conidia/kg, WG) against the main diseases of apricot (*Monilinia laxa*, *Taphrina deformans*, and *Coryneum* sp.). The trial was carried out near Turis, Southern Spain, in a farm representative of that area in terms of crops and cultivation techniques. "Mogador" was the variety of apricot chosen for the present trial, transplanted in 2014.

The use according to an embodiment of the invention of a composition comprising *Trichoderma atroviride* SC1 (referred to herein as "BCP511B") was compared to the reference standards Merpan 80 WG (captan, 80%, WG) and Cupravit Blu 35 WG (copper, 35%, WG). The treatments' list is presented in Table 3.

TABLE 3

Treatments according to embodiments of the invention and using reference standards

| Treatment number | Treatment name | Concentration | Type | Rate | Application Code |
|---|---|---|---|---|---|
| 1 | Untreated | — | — | — | — |
| 2 | Merpan 80 WG | 80% | WG | 150 g/100 L | ABCD |
| 3 | Cupravit Blu 35 WG | 35% | WG | 200 g/100 L | ABCD |
| 4 | BCP511B | 150 gA/L*** | WG | 100 g/ha* | ABCD |
| 5 | BCP511B | 150 gA/L | WG | 200 g/ha** | ABCD |

*100 g/ha = 100 × $10^{10}$ CFU/ha = $10^{12}$ CFU/ha;
**200 g/ha = 200 × $10^{10}$ CFU/ha = 2 × $10^{12}$ CFU/ha;
***gA/L is g product per L The target diseases *Monilinia laxa* and *Coryneum* sp. spread naturally in the trial field, with no need of artificial inoculation. No symptoms of *Taphrina deformans* were showed by the crop during the trial period. The weather conditions which occurred throughout the course of the trial ranged within the seasonal averages. The crop during the trial, never showed any symptoms of stress caused by unfavourable weather conditions or shortages of water or nutrients. The experimental design was an RCB with 4 replicates; each plot was made by 4 plants (3 m of distance within row; 5.5 m of row spacing), for a total surface of 49.5 m².

Four applications were executed: A: at 01 BBCH of the crop, B: at 57 BBCH, C: at 65 BBCH and D: at 69 BBCH. The assessments have been executed at 5, 21, 36 and 56 days after last application (DA-D). The presence of any symptoms of phytotoxicity due to the experimental products has been evaluated at 16 DA-A, 9 DA-B, 5 DA-C and 21 days after last application (21 DA-D). The fungicide efficacy was calculated on pest incidence and, by adopting the Abbott formula, the control percentage was calculated.

Efficacy Results on *Monilinia laxa*

5 DA-D, 69 BBCH of Crop

The untreated check scored 27.5% of infected flower clusters (pest incidence, %). All treatments resulted different from this outcome. The highest fungicide efficacy was recorded by treatment 2 with a pest incidence value of 1.5% (95.1% of efficacy). All other treatments showed higher pest incidence values (from 9.0% to 14.5%) with for treatment 3 an efficacy 66.1%, for treatment 4 an efficacy of 47.5%, and for treatment 5 an efficacy of 58.3%.

21 DA-D, 76 BBCH of Crop

The untreated check scored 11.5% of infected shoots (pest incidence, %). All treatments resulted different from this outcome. The highest fungicide efficacy was recorded by treatment 2 with a pest incidence value of 1.0% (91.2% of efficacy). Slightly higher pest incidence value was registered by treatment 3 with 2.9% of pest incidence, equal to 72.8% of efficacy, followed by treatment 5 with 4.3% of pest incidence, equal to 62.8% of efficacy. Treatment 4 showed a higher pest incidence value of 6.1% with an efficacy value of 46.3%.

Efficacy Results on *Coryneum* sp.

21 DA-D, 76 BBCH of Crop

On leaves, the untreated check scored an average pest incidence value equal to 9.0%. All treatments resulted different from such outcome. The highest fungicide efficacy was provided by treatment 2 with a pest incidence value of 0.8% (89.7% of efficacy) followed by treatment 3 with 3.0% of pest incidence, equal to 66.2% of efficacy, and by treatment 5 with 3.5% of pest incidence, equal to 60.6% of efficacy. Treatment 4 showed a higher pest incidence value of 6.5% with an efficacy value of 26.0%.

In terms of pest severity on leaves, the untreated check scored an average pest severity value equal to 0.55%. All treatments resulted different from such outcome. The highest control values were registered by treatment 2 with 0.04% of pest severity followed by treatment 3 with 0.15% of pest severity and by treatment 5 with 0.18% of pest severity.

36 DA-D, 81 BBCH of Crop

On leaves, the untreated check scored an average pest incidence value equal to 46.5%. All treatments resulted different from such outcome. The highest fungicide efficacy was provided by treatment 2 with a pest incidence value of 8.5% (81.6% of efficacy) and by treatment 3 with 10.5% of pest incidence, equal to 77.4% of efficacy, followed by treatment 5 with a pest incidence value of 18.0% (61.4% of efficacy). Treatment 4 showed a higher pest incidence value of 23.3% with an efficacy value of 50.0%.

In terms of pest severity on leaves, the untreated check scored an average pest severity value equal to 2.58%. All treatments resulted different from such outcome. The highest control values were registered by treatment 2 with 0.43% of pest severity followed by treatment 3 with 0.69% of pest severity and by treatment 5 with 1.0% of pest severity.

On fruits, the untreated check scored an average pest incidence value equal to 5.3%. All treatments resulted different from such outcome, but they did not differ each other with pest incidence values between 0.0% to 0.5% (91.4% to 100.0% of efficacy).

56 DA-D, 89 BBCH of Crop

On leaves, the untreated check scored an average pest incidence value equal to 73.3%. All treatments resulted different from such outcome. The highest fungicide efficacy was provided by treatment 2 with a pest incidence value of 29.0% (60.5% of efficacy) and by treatment 5 with 32.3% of pest incidence, equal to 55.8% of efficacy. The remaining treatments showed higher pest incidence values and lower efficacy values.

In terms of pest severity on leaves, the untreated check scored an average pest severity value equal to 8.0%. All treatments resulted different from such outcome. The highest control values were registered by treatment 2 with 2.5% of pest severity followed by treatment 5 with 2.88% of pest severity. On fruits, the untreated check scored an average pest incidence value equal to 11.8%. All treatments resulted different from such outcome. The highest fungicide efficacy was provided by treatment 2 with a pest incidence value of 1.0% (91.9% of efficacy) and by treatment 3 with 2.8% of pest incidence, equal to 76.2% of efficacy, followed by treatment 5 with 4.0% of pest incidence, equal to 65.4% of efficacy. Treatment 4 showed a higher pest incidence value on fruits of 7.5% with an efficacy value of 32.7%.

Conclusions

From the data gathered at the end of the trial it can be concluded that:

Regarding *Monilinia laxa*, the untreated check showed 27.5% of infected flower clusters and 11.5% of infected shoots, with an overall disease pressure that can be considered medium, whereas for *Coryneum* sp. the disease pressure resulted high, with the untreated check showing 73.3% of infected leaves and 11.8% of infected fruits;

Merpan 80 WG provided the highest fungicide activity;

BCP511B at 200 g/ha provided in general good fungicide efficacy against the target disease *Monilinia laxa*, being often comparable to the conventional standard Cupravit Blu 35 WG, and against *Coryneum* sp. being comparable to the conventional standard Merpan 80 WG;

A dose effect was observed for BCP511B, with the higher rate being superior to the lower rate;

Finally, no symptoms of phytotoxicity nor any negative effect on non-target organisms were detected at all during the whole trial period.

Example 4: Study of the Efficacy and Selectivity of *Trichoderma atroviride* Strain SC1 Against *Monilinia laxa* and *Coryneum* sp. on Cherry Trees (Variety "Early Lorry")

The trial was aimed at evaluating the efficacy and selectivity of *Trichoderma atroviride* SC1 ($1 \times 10^{13}$ active conidia/kg, WG) against the main diseases of cherry, namely *Monilinia laxa*, *Taphrina deformans* and *Coryneum* sp. The trial was carried out near Lipochori Skidra, Northern Greece, in a farm representative of that area in terms of crops and cultivation techniques. "Early Lory" was the variety of cherry chosen for the present trial, transplanted in 2010.

The use according to an embodiment of the invention of a composition comprising *Trichoderma atroviride* SC1 (referred to herein as "BCP511B") was compared to the reference standards Merpan 80 WG (captan, 80%, WG) and Cupravit Blu 35 WG (copper, 35%, WG). The treatments' list is the same as in Table 3, with the only exception that the application code for Cupravit Blu was ABD instead of ABCD.

The target disease *Monilinia laxa* and *Coryneum* sp. spread naturally in the trial field, with no need of artificial inoculation. No symptoms of *Taphrina deformans* were showed by the crop during the trial period. The weather conditions which occurred throughout the course of the trial ranged within the seasonal averages. The crop during the trial, never showed any symptoms of stress caused by unfavourable weather conditions or shortages of water or nutrients. The experimental design was an RCB with 4 replicates; each plot was made by 6 plants (1.25 m of distance within row; 3.5 m of row spacing), for a total surface of 26.25 m$^2$.

Four applications were executed: A: 01 BBCH of the crop, B: 57 BBCH, C: at 65 BBCH and D: at 69 BBCH of the crop. The assessments have been executed at 4 DA-D and 20, 30, 39 and 53 days after last application. The presence of any symptoms of phytotoxicity due to the experimental products has been evaluated at 10 DA-A, 11 DA-B, 11 DA-C and 4 days after last application (4 DA-D). The fungicide efficacy was calculated on pest incidence and, by adopting the Abbott formula, the control percentage was calculated.

Efficacy Results on *Monilinia laxa*
4 DA-D, 72 BBCH of Crop

The untreated check scored 31.5% of infected flower clusters (pest incidence, %). All treatments resulted different from this outcome. The highest fungicide efficacy was recorded by treatment 2 recording a pest incidence value of 7.0% (77.7% of efficacy), followed by treatment 5 recording a pest incidence value of 12.0% (62.4% of efficacy) and by treatment 3 with 15.0% of pest incidence, equal to 52.5% of efficacy. Treatment 4 showed a higher pest incidence value of 25.5% with an efficacy value of 19.0%.

30 DA-D, 81 BBCH of Crop

The untreated check scored 11.4% of infected shoots (pest incidence, %). All treatments resulted different from this outcome. The highest fungicide efficacy was recorded by treatment 2 with a pest incidence value of 1.3% (89.2% of efficacy). Slightly higher pest incidence value was registered by treatment 3, with 2.9% of pest incidence, equal to 74.6% of efficacy and by treatment 5 with 4.4% of pest incidence, equal to 60.7% of efficacy. Treatment 4 showed a higher pest incidence value of 8.6% with an efficacy value of 22.5%.

Efficacy Results on *Coryneum* sp.
53 DA-D, 89 BBCH of Crop

On leaves, the untreated check scored an average pest incidence value equal to 8.5%. All treatments resulted different from such outcome but they did not differ from each other with values ranging from 0.3% of pest incidence for treatment 2 equal to 96.4% of efficacy; to 1.3% of pest incidence for treatment 4 equal to 87.1% of efficacy.

In terms of pest severity on leaves, the untreated check scored an average pest severity value equal to 0.775%. All treatments resulted different from such outcome but not from each other, with values ranging from 0.013% of treatment 2, to 0.063% of treatment 4.

No disease on fruits was registered.

Conclusions

From the data gathered at the end of the trial it can be concluded that:

Regarding *Monilinia laxa*, the untreated check showed 31.5% of infected flower clusters and 11.4% of infected shoots, with an overall disease pressure that can be considered medium to high, whereas for *Coryneum* sp. the disease pressure resulted low, with the untreated check showing 8.5% of infected leaves;

Merpan 80 WG provided highest fungicide activity, often comparable with BCP511B at 200 g/ha and to the standard Cupravit Blu 35 WG;

A dose effect was observed for BCP511B, with the higher rate being superior to the lower rate;

Finally, no symptoms of phytotoxicity nor any negative effect on non-target organisms were detected at all during the whole trial period.

General Conclusion of Examples 1-4

From Examples 1-4 carried out on several stone fruit trees, in particular trees of the genus *Prunus*, namely nectarine trees (Examples 1 & 2), apricot trees (Example 3) and cherry trees (Example 4), it can be concluded that *Trichoderma atroviride* SC1 provided good fungicide efficacy against several diseases, while no symptoms of phytotoxicity or any negative effects on non-target organisms were detected. The fungicide efficacy was often comparable to treatments with known reference standards (e.g. Merpan 80 WG and Cupravit Blu 35 WG).

Example 5: Study of the Efficacy and Selectivity of *Trichoderma atroviride* Strain SC1 Against *Monilinia laxa* and *Coryneum* sp. on Cherry Trees (Variety "Prima Giant (Susana)"), and Comparison with Other *Trichoderma* Strains The trial was performed to evaluate the efficacy and selectivity of *Trichoderma atroviride* SC1 ($1 \times 10^{13}$ active conidia/kg, WG) and other *Trichoderma* strains against fungicidal diseases of cherry, e.g. *Monilinia laxa*, *Taphrina deformans* and *Coryneum* sp. The trial was carried out near Viver, Southern Spain, in a farm representative of that area in terms of crops and cultivation techniques. "Prime giant (susana)" was the variety of cherry chosen for the present trial, transplanted in 2013.

The use according to an embodiment of the invention of a composition comprising *Trichoderma atroviride* SC1 (referred to herein as "BCP511B") was compared to the reference standards Merpan 80 WG (captan, 80%, WG) and Cupravit Blu 35 WG (copper, 35%, WG). The treatments' list is the same as in Table 3, and in addition, treatments were performed with other *Trichoderma* strains such as *T. atroviride* I-1237 (ESQUIVE® WP, Agrauxine SA, France) or a combination of *Trichoderma asperellum* (strain ICC 012) and *Trichoderma gamsii* (strain ICC 080) (REMEDIER, Isagro S.p.A, Italy). All products were applied at a rate recommended by the respective producers for effective treatment of grape vines. Treatment 6: Esquive: Concentration: 5%, Type: WP; Rate: 4 kg/ha; Application code: ABCD. Treatment 7: Remedier: Concentration: 4%, Type: WP; Rate: 2.5 kg/ha; Application code: ABCD.

The target disease *Monilinia laxa* and *Coryneum* sp. spread naturally in the trial field, with no need of artificial inoculation. No symptoms of *Taphrina deformans* were showed by the crop during the trial period. The weather conditions which occurred throughout the course of the trial ranged within the seasonal averages. The crop during the trial, never showed any symptoms of stress caused by unfavourable weather conditions or shortages of water or nutrients. The experimental design was an RCB with 4 replicates; each plot was made by 4 plants (3.5 m of distance within row; 6.0 m of row spacing), for a total surface of 84 m².

Four applications were executed: A: at 01 BBCH of the crop, B: at 57 BBCH, C: at 65 BBCH and D: at 69 BBCH of crop. The assessments have been executed at 4, 18, 30, 43 and 64 days after last application (DA-D). The presence of any symptoms of phytotoxicity due to the experimental products has been evaluated at 16 DA-A, 7 DA-B, 17 DA-C and 18 days after last application (18 DA-D). The fungicide efficacy was calculated on pest incidence and, by adopting the Abbott formula, the control percentage was calculated.

Efficacy Results on *Monilinia laxa*
4 DA-D, 69 BBCH of Crop

The untreated check scored 15.5% of infected flower clusters (pest incidence, %). All treatments resulted different from this outcome. The highest fungicide efficacy was recorded by treatment 2 with a pest incidence value of 1.5% (89.6% of efficacy). All other treatments showed higher pest incidence values (from 6.5% to 11.0%) with efficacy values ranged between 27.6% to 58.3%.

30 DA-D, 76 BBCH of Crop

The untreated check scored 11.4% of infected shoots (pest incidence, %). All treatments resulted different from this outcome. The highest fungicide efficacy was recorded by treatment 2 with a pest incidence value of 2.0% (81.2% of efficacy). Slightly higher pest incidence value was registered by treatment 3 with 2.5% of pest incidence, equal to 77.3% of efficacy, followed by treatment 5 with 4.3% of pest incidence, equal to 61.9% of efficacy. Treatment 6 and 7 showed higher pest incidence values equal to an efficacy value of 39.8% and 39.9%, respectively.

Efficacy Results on *Coryneum* sp.

18 DA-D, 73 BBCH of Crop

On leaves, the untreated check scored an average pest incidence value equal to 14.3%. All treatments resulted different from such outcome. The highest fungicide efficacy was provided by treatment 2 with a pest incidence value of 0.5% (95.8% of efficacy) followed by treatment 3 with 3.3% of pest incidence, equal to 78.1% of efficacy and by treatment 5 with 3.8% of pest incidence, equal to 72.7% of efficacy. Treatment 6 and 7 showed higher pest incidence values (7.5% and 6.8%) with efficacy values of 45.6% and 52.7%, respectively.

In terms of pest severity on leaves, the untreated check scored an average pest severity value equal to 0.71%. All treatments resulted different from such outcome. The highest control values were registered by treatment 2 with 0.03% of pest severity.

43 DA-D, 79 BBCH of Crop

On leaves, the untreated check scored an average pest incidence value equal to 45.0%. All treatments resulted different from such outcome. The highest fungicide efficacy was provided by treatment 5 with a pest incidence value of 16.5% (63.3% of efficacy) and by treatment 2 with a pest incidence value of 16.8% (62.6% of efficacy). The remaining treatments showed higher pest incidence values (from 21.0% to 30.5%) with efficacy values for treatment 3 of 32.4%, for treatment 4 of 48.5%, for treatment 6 of 53.4%, and for treatment 7 of 50.3%.

In terms of pest severity on leaves, the untreated check scored an average pest severity value equal to 5.0%. All treatments resulted different from such outcome. The highest control values were registered by treatment 5 with 1.08% of pest severity.

64 DA-D, 87 BBCH of Crop

On leaves, the untreated check scored an average pest incidence value equal to 76.5%. All treatments resulted different from such outcome. The highest fungicide efficacy was provided by treatment 2 with a pest incidence value of 34.0% (55.6% of efficacy) and by treatment 5 with 38.8% of pest incidence, equal to 49.4% of efficacy. The remaining treatments showed higher pest incidence values (from 45.8% to 54.0%) with efficacy values for treatment 3 of 29.3%, for treatment 4 of 33.3%, for treatment 56 of 39.0%, and for treatment 7 of 40.0%.

In terms of pest severity on leaves, the untreated check scored an average pest severity value equal to 13.75%. All treatments resulted different from such outcome. The highest control values were registered by treatment 2 and by treatment 5 both with 6.0% of pest severity.

On fruits, no disease was registered.

Conclusions

From the data gathered at the end of the trial it can be concluded that:

Regarding *Monilinia laxa*, the untreated check showed 15.5% of infected flower clusters and 11.4% of infected shoots, with an overall disease pressure that can be considered medium/low, whereas for *Coryneum* sp. the disease pressure resulted high, with the untreated check showing 76.5% of infected leaves;

BCP511B applied at 200 g/ha provided in general good fungicide efficacy against the target disease *Coryneum* sp. being comparable to the conventional standard Merpan 80 WG;

Pest incidence and pest severity were lower with treatment 5 as compared to treatments 6 and 7. Hence, treatment 5 with *Trichoderma atroviride* strain SC1 showed higher fungicidal efficacy than treatment 6 with *Trichoderma atroviride* strain I-1237, and also than treatment 7 with a combination of *Trichoderma asperellum* (strain ICC 012) and *Trichoderma gamsii* (strain ICC 080);

A dose effect was observed for BCP511B, with the higher rate being superior to the lower rate;

Finally, no symptoms of phytotoxicity nor any negative effect on non-target organisms were detected at all during the whole trial period.

Example 6: Study of the Efficacy and Selectivity of *Trichoderma atroviride* Strain SC1 Against *Monilinia laxa* on Apricot Trees (Variety "Kyoto") and Comparison with Other *Trichoderma* Strains The trial was performed to evaluate the efficacy and selectivity of *Trichoderma atroviride* SC1 ($1 \times 10^{13}$ active conidia/kg, WG) and other *Trichoderma* strains against fungicidal diseases of apricot, e.g. *Monilinia laxa*. The trial was carried out near Cotignola, in Ravenna province (Emilia Romagna region), in a farm representative of that area in terms of crops and cultivation techniques. "Kyoto" was the variety of apricot chosen for the present trial, transplanted in 1999.

The treatments' list is the same as in Example 5, with the exception that the application code for Cupravit Blu was ABD instead of ABCD.

The target disease *Monilinia laxa* spread naturally in the trial field, with no need of artificial inoculation. Concerning *Coryneum beijerincki* and *Taphrina deformans*, no symptoms were registered during the course of the trial. The weather conditions which occurred throughout the course of the trial ranged within the seasonal averages. The crop during the trial, never showed any symptoms of stress caused by unfavourable weather conditions or shortages of water or nutrients. The experimental design was an RCB with 4 replicates; each plot was made by 4 plants (3.3 m of distance within row; 5.9 m of row spacing), for a total surface of 77.88 m$^2$.

Four applications were executed: A: at 01 BBCH of the crop, B: at 57 BBCH, C: at 65 BBCH and D: at 69 BBCH of the crop. The assessments have been executed at 3 and 44 days after last application, evaluating the number of flower clusters and shoots attached. The presence of any symptoms of phytotoxicity due to the experimental products has been evaluated at 17 DA-A, 13 DA-B, 7 DA-C and 7 days after last application (7 DA-D). The fungicide efficacy was calculated on pest incidence and, by adopting the Abbott formula, the control percentage was calculated.

Efficacy Results on *Monilinia laxa*

3 DA-D, 69 BBCH of Crop

The untreated check scored 36.0% of infected flower clusters (pest incidence, %). All treatments resulted different from this outcome. The highest fungicide efficacy was recorded by treatment 2 with a pest incidence value of 10.5% (71.2% of efficacy), slightly higher pest incidence values were registered by treatment 3 and treatment 5 with 16.5% and 17.0% of pest incidence, equal to 54.3% and 53.2% of efficacy. The remaining treatments showed higher pest incidence values (from 24.0% to 27.5%) with efficacy values for treatment 4 of 33.3%, for treatment 6 of 25.8%, and for treatment 7 of 23.6%.

44 DA-D, 77 BBCH of Crop

The untreated check scored 10.4% of infected shoots (pest incidence, %). All treatments resulted different from this outcome. The highest fungicide efficacy was recorded by treatment 2 with a pest incidence value of 0.8% (92.0% of efficacy), slightly higher pest incidence values were registered by treatment 3 and treatment 5 both with 3.7% of pest incidence, equal to 63.4% and 63.6% of efficacy. The remaining treatments showed higher pest incidence values (from 5.7% to 8.0%) with efficacy values for treatment 4 of 43.5%, for treatment 6 of 21.6%, and for treatment 7 of 30.6%.

Conclusions

From the data gathered at the end of the trial it can be concluded that:
  The untreated check scored 36.0% of infected flower clusters and 10.4% of infected shoots. The overall disease pressure can be considered medium to high;
  BCP511B at 200 g/ha provided in general high fungicide efficacy against the target disease *Monilinia laxa*, being always comparable to the conventional standard Cupravit Blu 35 WG;
  Pest incidence on flower clusters and on shoots were always lower with treatment 5, and—to a lesser extent—with treatment 4, as compared to treatments 6 and 7. Hence, treatment 5 with *Trichoderma atroviride* strain SC1 showed higher fungicidal efficacy than treatment 6 with *Trichoderma atroviride* strain I-1237, and also than treatment 7 with a combination of *Trichoderma asperellum* (strain ICC 012) and *Trichoderma gamsii* (strain ICC 080);
  A dose effect was observed for BCP511B, with the higher rate being superior to the lower rate;
  Finally, no symptoms of phytotoxicity nor any negative effect on non-target organisms were detected at all during the whole trial period.

Example 7: Study of the Efficacy and Selectivity of *Trichoderma atroviride* Strain SC1 Against *Monilinia laxa*, *Taphrina deformans*, and *Coryneum* sp. on Nectarine Trees (Variety "Orion") and Comparison with Other *Trichoderma* Strains This trial was aimed at evaluating the efficacy and selectivity of *Trichoderma atroviride* SC1 ($1 \times 10^{13}$ active conidia/kg, WG) against the main diseases of nectarine, namely *Monilinia laxa*, *Taphrina deformans* and *Coryneum beijerinckii*. The trial was carried out near Budrio, in Bologna province (Emilia Romagna region, Italy) in a farm representative of that area in terms of crops and cultivation techniques. "Orion" was the variety of peach-nectarine chosen for the present trial, transplanted in 2013.

The treatments' list is the same as in Example 5, with the exception that the application code for Cupravit Blu was ABD instead of ABCD.

The target disease *Taphrina deformans*, *Monilinia laxa* and *Coryneum* sp. spread naturally in the trial field, with no need of artificial inoculation. The weather conditions which occurred throughout the course of the trial ranged within the seasonal averages. The crop during the trial, never showed any symptoms of stress caused by unfavourable weather conditions or shortages of water or nutrients. The experimental design was an RCB with 4 replicates; each plot was made by 4 plants (3.0 m of distance within row; 4.6 m of row spacing), for a total surface of 41.4 m².

Four applications were executed: A: at 01 BBCH of the crop, B: at 57 BBCH, C: at 65 BBCH and D: at 69 BBCH of the crop. The assessments have been executed at 4, 20, 40 and 71 days after last application, evaluating the number of flower clusters and shoots attached. The presence of any symptoms of phytotoxicity due to the experimental products has been evaluated at 20 DA-A, 7 DA-B, 10 DA-C and 7 days after last application (7 DA-D). The fungicide efficacy was calculated on pest incidence and, by adopting the Abbott formula, the control percentage was calculated.

Efficacy Results on *Taphrina deformans*

40 DA-D, 76 BBCH of Crop

The untreated check scored an average percentage of infected leaves (pest incidence, %) equal to 60.0%. All treatments resulted different from such outcome. The highest fungicide efficacy was recorded by treatment 2. with a pest incidence value of 5.3% (91.2% of efficacy), followed by treatment 3 with a pest incidence value of 21.2% (65.0% of efficacy) and from treatment 5 that scored 29.9% of pest incidence (50.5% of efficacy). Treatment 6 provided the lowest fungicide efficacy, showing 54.7% of pest incidence (9.7% of efficacy), while the remaining treatments showed efficacy values ranged between 38.0% to 47.5%.

Efficacy Results on *Monilinia laxa*

4 DA-D, 69 BBCH of Crop

The untreated check scored 25.0% of infected flower clusters (pest incidence, %). All treatments resulted different from this outcome. The highest fungicide efficacy was recorded by treatment 2. with a pest incidence value of 1.0% (95.6% of efficacy), slightly higher pest incidence value was registered by treatment 3 with 7.5% of pest incidence, equal to 68.9% of efficacy, followed by treatment 5 with 10.5% of pest incidence, equal to 55.8% of efficacy. Treatment 7 had a higher pest incidence value of 12.5%, equal to 49.2% of efficacy. The remaining treatments showed higher pest incidence values with efficacy values for treatment 4 of 40.2% and for treatment 6 of 28.7%.

40 DA-D, 76 BBCH of Crop

The untreated check scored 30.4% of infected shoots (pest incidence, %). All treatments resulted different from this outcome. The highest fungicide efficacy was recorded by treatment 2 with a pest incidence value of 9.3% (69.5% of efficacy). Slightly higher pest incidence value was registered by treatment 3 with 11.9% of pest incidence, equal to 60.8% of efficacy, and by treatment 5 with 12.9% of pest incidence, equal to 57.4% of efficacy, that not differed statistically from each other. The remaining treatments showed higher pest incidence values with efficacy values for treatment 4 of 35.8%, for treatment 6 of 16.0%, and for treatment 7 of 49.2%.

Efficacy Results on *Coryneum* sp.

71 DA-D, 81 BBCH of Crop

At this assessment the target disease appeared on leaves and fruits. On leaves, the untreated check scored an average pest incidence value equal to 27.3%. All treatments resulted different from such outcome. The highest fungicide efficacy was provided by treatment 2 with a pest incidence value of 9.3% (66.2% of efficacy) and treatment 5 with 10.3% of pest incidence (61.1% of efficacy), followed by treatment 3 with 12.3% of pest incidence, equal to 54.8% of efficacy. Treatment 7 had higher pest incidence of 13.8%, and 48.0% of efficacy. The remaining treatments showed higher pest incidence values with efficacy values for treatment 4 of 36.0%, and for treatment 6 of 29.6%.

In terms of pest severity on leaves, the untreated check scored an average pest severity value equal to 3.0%. All treatments resulted different from such outcome. The highest control values were registered by treatment 3 and treatment 5 with respectively 0.43% and 0.53% of pest severity (efficacy control of 84.5% and 80.4%).

On fruits, the untreated check scored an average pest incidence value equal to 19.8%. All treatments resulted different from such outcome. The highest fungicide efficacy was provided by treatment 5 with 2.8% of pest incidence (85.7% of efficacy) and treatment 3 with 3.3% of pest incidence, equal to 83.8% of efficacy. Higher pest incidence was registered by treatment 2 with a pest incidence value of 5.3% (74.0% of efficacy) and treatment 7 with 5.3% of pest incidence, and 73.6% of efficacy. The remaining treatments showed higher pest incidence values with efficacy values for treatment 4 of 59.0%, and for treatment 6 of 57.2%.

Conclusions

From the data gathered at the end of the trial it can be concluded that:

- The disease pressure due to *Taphrina deformans* can be considered high, with the untreated check showing an average pest incidence on leaves equal to 60.0%; Regarding *Monilinia laxa*, the disease pressure in the trial field resulted from medium to high, with the untreated check showing 25.0% of infected flower clusters and 30.4% of pest incidence on shoots; Also, for *Coryneum* sp. the disease pressure resulted medium to high, with the untreated check showing 19.8% of pest incidence on fruits and 27.3% of pest incidence on leaves;
- BCP511B applied at 200 g/ha provided in general high fungicide efficacy against the target diseases, being often comparable to the conventional standard Cupravit Blu 35 WG;
- Pest incidence on leaves, flower clusters, shoots and fruits, and pest severity on leaves, were always lower with treatment 5 as compared to treatments 6 and 7. Hence, treatment 5 with *Trichoderma atroviride* strain SC1 showed higher fungicidal efficacy than treatment 6 with *Trichoderma atroviride* strain I-1237, and also than treatment 7 with a combination of *Trichoderma asperellum* (strain ICC 012) and *Trichoderma gamsii* (strain ICC 080);
- A dose effect was observed for BCP511B, with the higher rate being superior to the lower rate;
- Finally, no symptoms of phytotoxicity nor any negative effect on non-target organisms were detected at all during the whole trial period.

General Conclusion from Examples 5-7

From Examples 5-7 carried out on several stone fruit trees, in particular trees of the genus *Prunus*, namely cherry trees (Examples 5), apricot trees (Example 6) and nectarine trees (Example 7), it can be concluded that *Trichoderma atroviride* SC1 provided good fungicide efficacy on several main diseases, while no symptoms of phytotoxicity or any negative effects on non-target organisms were detected. The fungicide efficacy was often comparable to treatments with known reference standards (e.g. Merpan 80 WG and Cupravit Blu 35 WG). Furthermore, the results obtained with *Trichoderma atroviride* strain SC1 were unexpectedly superior to those obtained with other *Trichoderma* strains including *T. atroviride* I-1237 (ESQUIVE® WP, Agrauxine SA, France) and a combination of *Trichoderma asperellum* (strain ICC 012) and *Trichoderma gamsii* (strain ICC 080) (REMEDIER, Isagro S.p.A, Italy).

What is claimed is:

1. A method for controlling or reducing a fungal infection on a stone fruit tree, wherein the stone fruit tree is a tree of the genus *Prunus*, the method consisting of applying a composition consisting of *Trichoderma atroviride* strain SC1 and optionally one or more auxiliaries to the tree or the locus of the tree in an amount of from $1\times10^{12}$ CFU/ha to $1\times10^{14}$ CFU/ha, thereby controlling or reducing the fungal infection on the stone fruit tree, wherein the fungal infection is selected from the group consisting of *Coryneum beijerinckii, Taphrina deformans, Monihnia laxa*, and *Fusicoccum amygdali*, wherein the stone fruit tree is a tree of the genus *Prunus* selected from the group consisting of a peach tree, a nectarine tree, a plum tree, a damson tree, a cherry tree, an apricot tree, and an almond tree.

2. The method according to claim 1, wherein the *Trichoderma atroviride* strain SC1, is applied in a composition comprising one or more auxiliaries.

3. The method according to claim 2, wherein the composition is a sprayable liquid.

4. The method according to claim 1, wherein the *Trichoderma atroviride* strain SC1 is applied to the whole of the above-ground part of the tree.

5. The method according to claim 1, wherein the *Trichoderma atroviride* strain SC1 is applied to any one or more of the leaves, the shoots or the flowers of the tree.

6. The method according to claim 2, wherein the *Trichoderma atroviride* strain SC1 is present in the composition in an amount of from $1\times10^{6}$ CFU/L to $1\times10^{14}$ CFU/L, or from $1\times10^{7}$ CFU/L to $1\times10^{13}$ CFU/L, or from $1\times10^{8}$ CFU/L to $1\times10^{13}$ CFU/L, or from $1\times10^{9}$ CFU/L to $1\times10^{13}$ CFU/L, or from $1\times10^{10}$ CFU/L to $1\times10^{13}$ CFU/L.

7. The method according to claim 1, wherein the *Trichoderma* is applied in an amount of from $2\times10^{12}$ CFU/ha to $1\times10^{13}$ CFU/ha.

8. The method according to claim 1, wherein the amount is from $2\times10^{12}$ CFU/ha to $1\times10^{14}$ CFU/ha.

9. The method according to claim 1, wherein the one or more auxiliaries are selected from the group consisting of supplements; additives; solid carriers; solvents; thickeners; adjuvants; emulsifiers; dispersants; plant nutrients; micronutrients; wetting agents; lecithin; saponins; UV protectors; antioxidants; and diluents.

\* \* \* \* \*